United States Patent
Lin et al.

(10) Patent No.: US 9,219,352 B2
(45) Date of Patent: Dec. 22, 2015

(54) POWER OFF DELAY CIRCUIT AND METHOD, AND AUDIO SYSTEM WITH POWER OFF DELAY

(71) Applicant: RICHTEK TECHNOLOGY CORP., Zhubei (TW)

(72) Inventors: Chi-Hua Lin, Hsinchu (TW); Chien-Fu Tang, Hsinchu (TW); Isaac Y. Chen, Jubei (TW); An-Tung Chen, Pingjen (TW)

(73) Assignee: RICHTEK TECHNOLOGY CORP., Chupei, Hsinchu (TW)

( * ) Notice: Subject to any disclaimer, the term of this patent is extended or adjusted under 35 U.S.C. 154(b) by 53 days.

(21) Appl. No.: 14/165,406

(22) Filed: Jan. 27, 2014

(65) Prior Publication Data

US 2014/0139043 A1     May 22, 2014

Related U.S. Application Data

(63) Continuation of application No. 12/818,539, filed on Jun. 18, 2010, now Pat. No. 8,674,554.

(30) Foreign Application Priority Data

Jun. 23, 2009 (TW) .............................. 98121046 A

(51) Int. Cl.
    *H02B 1/24*            (2006.01)
    *H04R 3/00*            (2006.01)

(52) U.S. Cl.
    CPC .................. *H02B 1/24* (2013.01); *H04R 3/007* (2013.01); *Y10T 307/74* (2015.04); *Y10T 307/766* (2015.04)

(58) Field of Classification Search
    CPC ........ H04R 3/007; H02B 1/24; Y10T 307/74; Y10T 307/766
    USPC ......................................... 307/112, 116, 326
    See application file for complete search history.

(56) References Cited

U.S. PATENT DOCUMENTS

| | | |
|---|---|---|
| 5,424,903 A | 6/1995 | Schreiber |
| 5,778,238 A | 7/1998 | Hofhine |
| 5,929,603 A | 7/1999 | Nakao et al. |
| 6,028,474 A | 2/2000 | Ito |
| 6,369,466 B1 | 4/2002 | Murphy |

(Continued)

FOREIGN PATENT DOCUMENTS

| | | |
|---|---|---|
| CN | 101018041 | 8/2007 |
| CN | 101071992 | 11/2007 |

(Continued)

*Primary Examiner* — Rexford Barnie
*Assistant Examiner* — Toan Vu
(74) *Attorney, Agent, or Firm* — Muncy, Geissler, Olds & Lowe, P.C.

(57) ABSTRACT

A power off delay circuit includes a switch connected between an external power input terminal and an internal power supply terminal, a capacitor connected to the internal power supply terminal, and a hysteresis comparator to switch the switch according to the voltages of the external power input terminal and the internal power supply terminal. During on-time of the switch, the external power input terminal is connected to the internal power supply terminal and the capacitor can be charged by the external power source. When the switch is off, the capacitor provides electric power for an internal circuit. Application of the power off delay circuit to an audio system may eliminate the turn-off pops of the audio system.

13 Claims, 6 Drawing Sheets

(56) References Cited

U.S. PATENT DOCUMENTS

| | | |
|---|---|---|
| 7,368,768 B2 | 5/2008 | Hayashida et al. |
| 2003/0111911 A1 | 6/2003 | Hsu |
| 2004/0073264 A1 | 4/2004 | Lyden |
| 2006/0158168 A1 | 7/2006 | Yoshida et al. |
| 2006/0288242 A1 | 12/2006 | Song |
| 2010/0318306 A1* | 12/2010 | Tierney et al. ......... 702/62 |

FOREIGN PATENT DOCUMENTS

| | | |
|---|---|---|
| CN | 101087130 | 12/2007 |
| CN | 101110569 | 1/2008 |
| TW | 200917001 | 4/2009 |

* cited by examiner

US 9,219,352 B2

POWER OFF DELAY CIRCUIT AND METHOD, AND AUDIO SYSTEM WITH POWER OFF DELAY

CROSS REFERENCE TO RELATED APPLICATIONS

This application is a Continuation Application and claims benefits of U.S. patent application Ser. No. 12/818,539, filed on 18 Jun. 2010, currently pending.

FIELD OF THE INVENTION

The present invention is related generally to an audio system and, more particularly, to a power off delay circuit and method for an audio system.

BACKGROUND OF THE INVENTION

Conventionally, to avoid pop generation by a loudspeaker of an audio system at power on or power off, an audio mute integrated circuit (IC) is adopted to eliminate pops. At power off, however, the audio mute IC lacks a sufficient supply voltage to support proper operation of its internal circuit, and is thus hard to maintain its mute function. To solve this problem, the supply voltage of the audio mute IC must be given with a longer sustained interval of time at power off so that after the power off, the internal circuit of the audio mute IC can still work normally for a period of time for the audio mute function to come into play, and the output signal of the audio system can still be properly maintained for a period of time.

U.S. Pat. No. 5,778,238 inserts a P-N junction diode between an external power source and a capacitor to charge the capacitor, so that the capacitor can provide energy for a low-voltage detector when the power source is removed, and thereby turns on a MOSFET to discharge a delay capacitor at the input terminal of a power on reset (POR) circuit. This will prevent the delay capacitor from providing a shorter delay time at the next power on. However, the diode connected between the external power source and the internal circuit leads to an additional voltage drop, and thus decreases the margin of the working voltage of the internal circuit. Moreover, the voltage outputted from the diode will fluctuate with the external supply voltage.

SUMMARY OF THE INVENTION

An object of the present invention is to provide a power off delay circuit and method for an audio system.

An object of the present invention is to provide an audio system with power off delay.

According to the present invention, a power off delay circuit for an audio system includes an external power input terminal, an internal power supply terminal, and a switch connected therebetween. A hysteresis comparator compares the voltages of the external power input terminal and the internal power supply terminal, thereby turns on the switch to connect the external power input terminal to the internal power supply terminal when the voltage of the internal power supply terminal is lower than that of the external power input terminal, to charge a capacitor connected to the internal power supply terminal, and turns off the switch to disconnect the external power input terminal from the internal power supply terminal when the voltage of the internal power supply terminal is higher than that of the external power input terminal.

According to the present invention, a power off delay method for an audio system includes monitoring the voltages of an external power input terminal and an internal power supply terminal and according thereto, hysteretically switching a switch connected between the external power input terminal and the internal power supply terminal. When the voltage of the internal power supply terminal is lower than that of the external power input terminal, the switch is turned on to charge a capacitor connected to the internal power supply terminal. When the voltage of the internal power supply terminal is higher than that of the external power input terminal, the switch is turned off.

According to the present invention, an audio system includes an audio line, a drive transistor connected to the audio line, and a power off delay circuit connected to the drive transistor. The power off delay circuit has an external power input terminal, an internal power supply terminal, and a capacitor connected to the internal power supply terminal. When the voltage of the internal power supply terminal is lower than that of the external power input terminal, the capacitor is charged. At power off, the capacitor supplies a current to the drive transistor to pull down the voltage of the audio line.

Preferably, a PMOSFET is used as the switch to reduce the voltage drop thereacross as much as possible.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
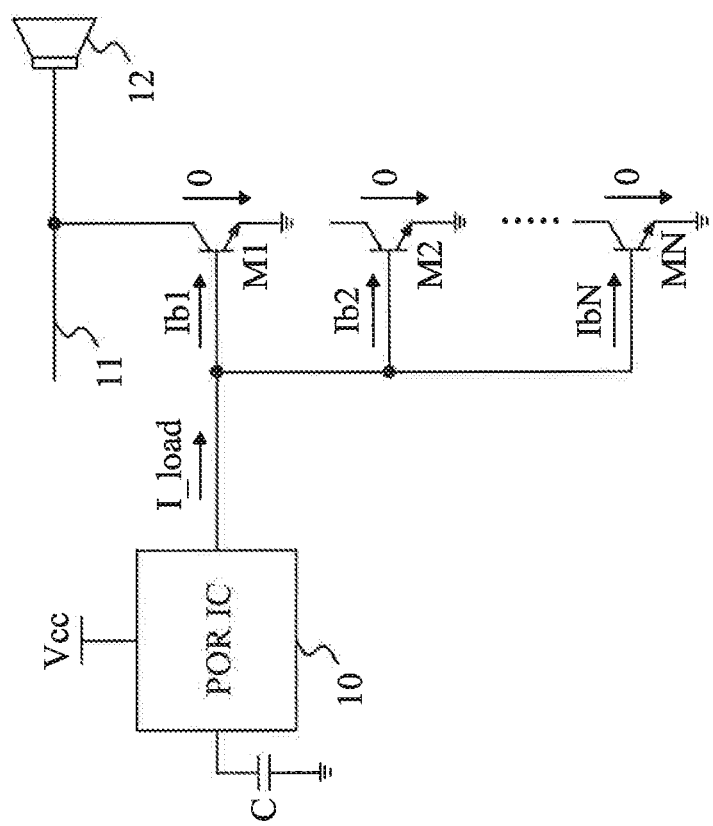
FIG. 1 is a block diagram of an audio system using a power off delay circuit of the present invention.
Figure 2:
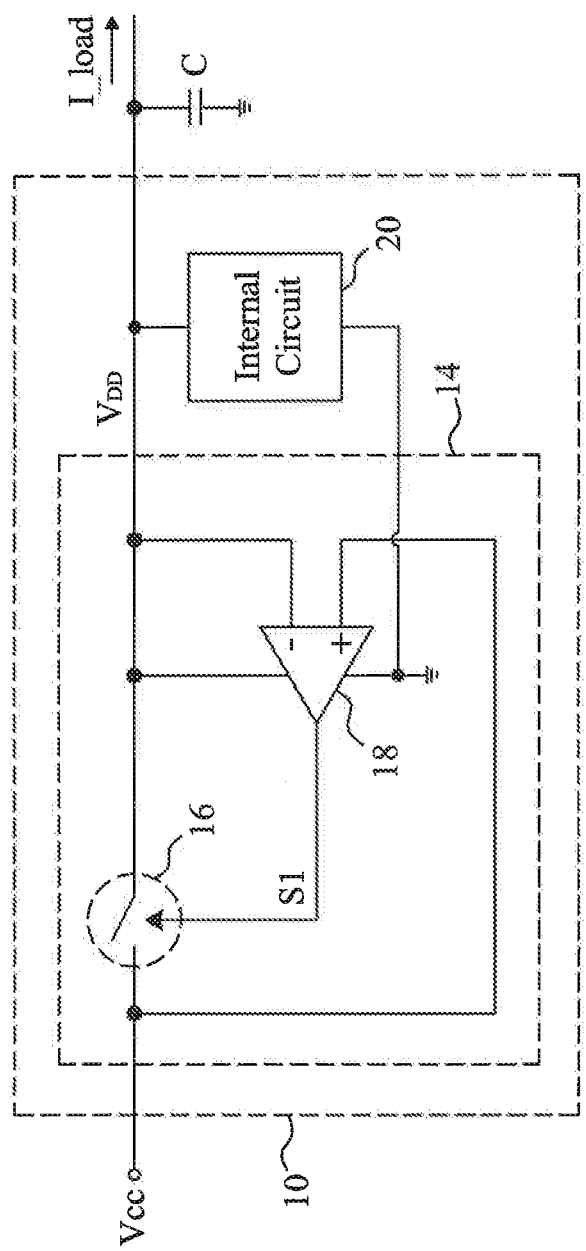
FIG. 2 is an embodiment of the power off delay circuit according to the present invention.

FIG. 1 is a block diagram of an audio system using a power off delay circuit of the present invention, in which a POR IC 10 is connected to an external power source Vcc, an external capacitor C, and a plurality of drive transistors M1-MN, each of which is connected to a loudspeaker 12 through an audio line 11. When the POR IC 10 detects an abnormal condition from the external supply voltage Vcc, e.g. power down, a load current I_load is provided to the drive transistors M1-MN from electric charges stored by the capacitor C to pull down the voltage of the audio line 11 to zero, to avoid pop generation. The POR IC 10 includes a power off delay circuit according to the present invention, which delays the timing of internal power off of the POR IC 10 so that the POR IC 10 can still maintain an enough load current I_load for a period of time after the power down of the external power source Vcc. As shown in FIG. 2, a power off delay circuit 14 includes the external capacitor C connected to an internal power supply terminal $V_{DD}$, a switch 16 connected between an external power input terminal Vcc and the internal power supply terminal $V_{DD}$, and a hysteresis comparator 18 configured to switch the switch 16 according to the voltages Vcc and $V_{DD}$. The hysteresis comparator 18 has a first input terminal connected to the external power input terminal Vcc, a second input terminal connected to the internal power supply terminal $V_{DD}$, and an output terminal connected to the switch 16 for providing a control signal S1 to switch the switch 16. In a first state, the switch 16 is on to connect the external power input terminal Vcc to the internal power supply terminal $V_{DD}$ so that the capacitor C can be charged by the external power source Vcc. In a second state, the switch 16 is off to disconnect the external power input terminal Vcc from the internal power supply terminal $V_{DD}$, and the capacitor C provides electric power for operation of an internal circuit 20. Through hysteretically controlling connection and disconnection between the external power input terminal Vcc and the internal power supply terminal $V_{DD}$, the internal supply voltage $V_{DD}$ can be maintained stable. The capacitance of the capacitor C defines the delay time of the power off delay circuit 14, i.e., the period of time for sustaining proper operation of the internal circuit 20 by the power off delay circuit 14. In this embodiment, the capacitor C is disposed outside the POR IC 10 to facilitate adjustment of its capacitance to optimize the delay time. In other embodiments, the capacitor C may also be disposed inside the POR IC 10 depending on system requirements.

Figure 3:
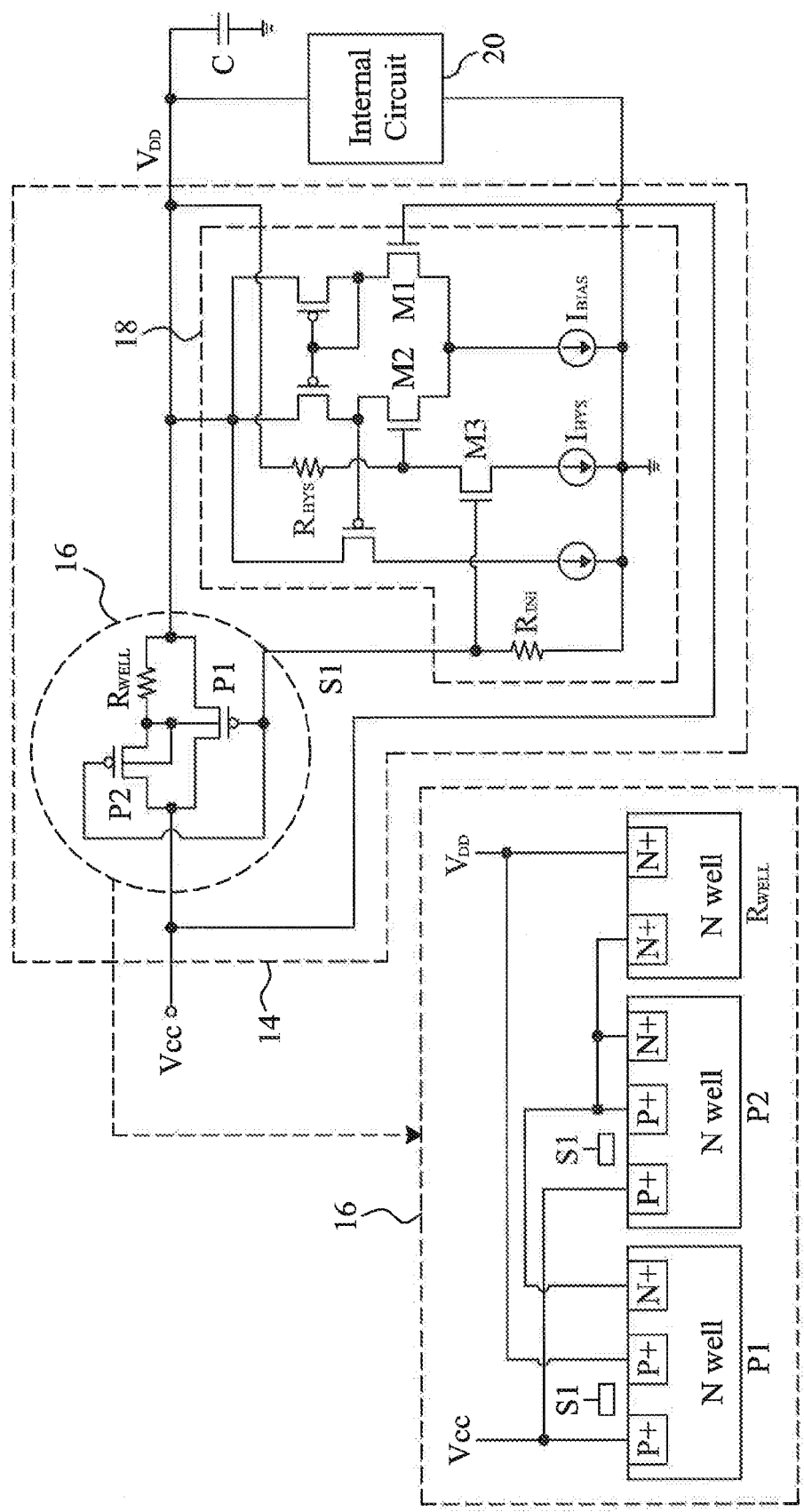
FIG. 3 is an embodiment for the switch and the hysteresis comparator shown in FIG. 2.
Figure 4:
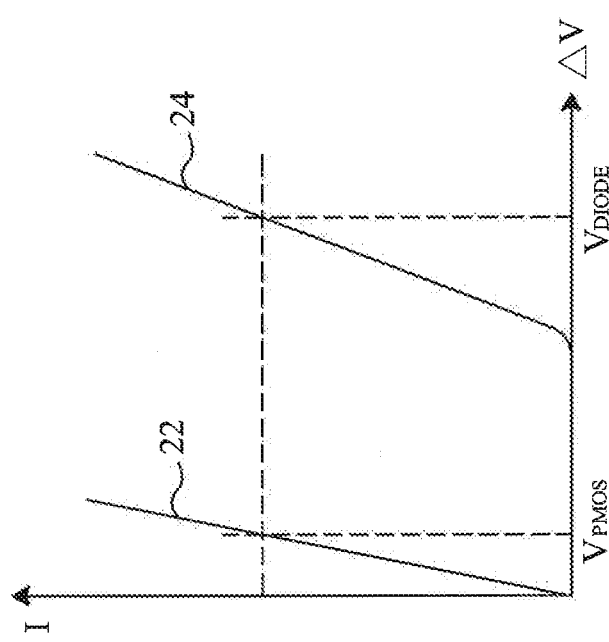
FIG. 4 is a diagram showing the IN curves of a diode and a MOSFET.

FIG. 3 is an embodiment for the switch 16 and the hysteresis comparator 18, in which the switch 16 includes a PMOSFET P1 connected between the external power input terminal Vcc and the internal power supply terminal $V_{DD}$, under control of the control signal S1, and a voltage switching circuit having a PMOSFET P2 and a resistor $R_{WELL}$ connected between the external power input terminal Vcc and the internal power supply terminal $V_{DD}$. The PMOSFET P2 is connected between the external power input terminal Vcc and the Tell that the PMOSFET P1 is formed thereon, and the resistor $R_{WELL}$ is connected between the internal power supply terminal $V_{DD}$ and the well that the PMOSFET P1 is formed thereon. The PMOSFET P1 is used as the switch 16 in order to decrease the voltage drop across the switch 16 as much as possible. The PMOSFET P2 and the resistor $R_{WELL}$ are configured with a switching well architecture for connecting the well that the PMOSFET P1 is formed thereon to the highest voltage to improve the capability against latch-up. In this embodiment, the PMOSFET P1 defines the voltage drop between the external power input terminal Vcc and the internal power supply terminal $V_{DD}$ when the switch 16 is on, the PMOSFET P2 and the resistor $R_{WELL}$ are configured to switch the voltage of an N-well between different ones, depending on connection to either the external power input terminal Vcc or the internal power supply terminal $V_{DD}$. When the external supply voltage Vcc is higher than the internal supply voltage $V_{DD}$, the hysteresis comparator 18 turns on the PMOSFETs P1 and P2 to connect the N-well to the external power source Vcc through the PMOSFET P2 so that the base (i.e., the N-well) of the PMOSFET P1 is connected to a high voltage terminal Vcc. When the external supply voltage Vcc is lower than the internal supply voltage $V_{DD}$, the PMOSFETs P1 and P2 are turned off by the hysteresis comparator 18 so that the base of the PMOSFET P1 is connected by a parasitic resistor $R_{WELL}$ to a high voltage terminal $V_{DD}$. By switching the voltage of the N-well, the PMOSFET P1 operates just like a switch element. FIG. 4 is a schematic view of comparing the effect of the present invention against that of the prior art, in which ΔV on the horizontal axis represents the voltage drop across the switch 16, the vertical axis represents the current of the switch 16, the curve 22 is the current-voltage (I-V) curve of the PMOSFET P1, and the curve 24 is the I-V curve of a diode. The PMOSFET P1 operates as a switch element with a voltage difference ΔV of about 0.1V existing thereacross, which is lower than the on-state voltage drop $V_{DIODE}$ (about 0.6 V) of the diode, so the voltage drop between the external power input terminal Vcc and the internal power supply terminal $V_{DD}$ is reduced; furthermore, the internal supply voltage $V_{DD}$ (=Vcc-ΔV) is higher than the internal supply voltage (=Vcc-$V_{DIODE}$) of the diode, so the marginal of the working voltage of the internal circuit 20 is increased by about 0.5 V. On the other hand, the curve 22 has an increasing slope $$\text{Slope}=1/\text{Ron} \quad \text{[Eq-1]}$$

where Ron is the on-resistance of the PMOSFET P1. Increasing the size of a PMOSFET will reduce its on-resistance Ron and thereby have a steeper increasing slope Slope of the curve 22.

Figure 5:
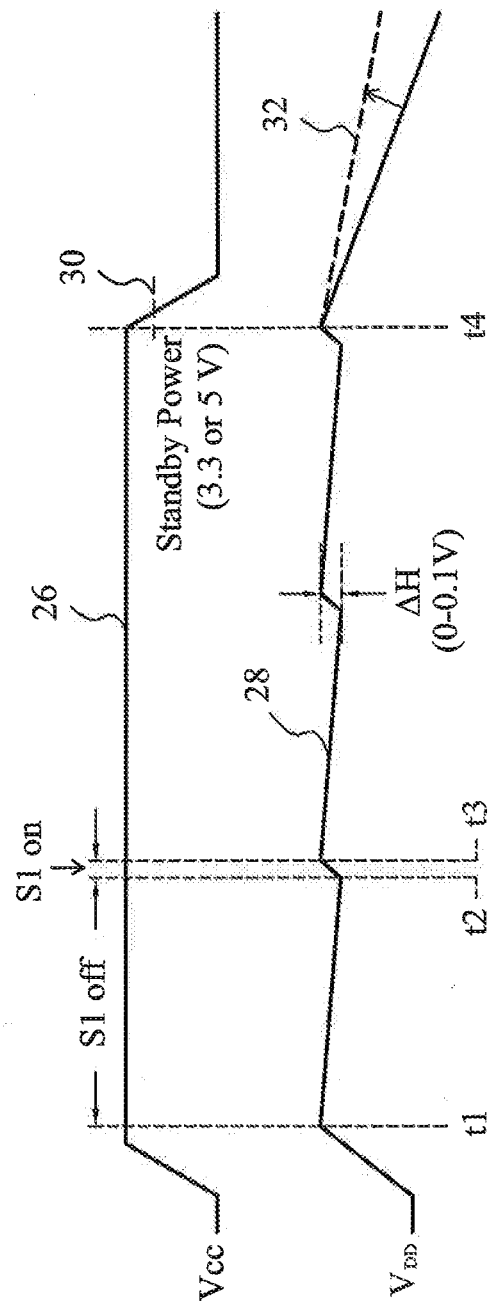
FIG. 5 is a waveform diagram of an external supply voltage and an internal supply voltage in the embodiment shown in FIG. 3.

Referring back to FIG. 3, the hysteresis comparator 18 includes a pair of input transistors M1 and M2, the gate of the input transistor M1 being connected to the external power input terminal Vcc, a bias current source $I_{BIAS}$ connected to the input transistors M1 and M2, a hysteresis resistor $R_{HYS}$ connected between the second input terminal of the hysteresis comparator 18 and the gate of the input transistor M2, and a hysteresis current source $I_{HYS}$ connected in series to the resistor $R_{HYS}$ to provide a current flowing through the resistor $R_{HYS}$ to establish a voltage drop to define the hysteresis band ΔH of the hysteresis comparator 18. Preferably, an initial-state setting resistor $R_{INI}$ is connected to the output terminal of the hysteresis comparator 18 to preset the output signal S1 of the output terminal to a logic low level so that the PMOSFET P1 is preset to on state. Referring to FIG. 5, the waveform 26 represents the external supply voltage Vcc, the waveform 28 represents the internal supply voltage $V_{DD}$, and the level 30 represents a standby power of the external power source Vcc, usually 3.3 V or 5 V. After power on, the external supply voltage Vcc rises from 0V to a rated value, during which process the internal supply voltage $V_{DD}$ also rises accordingly because the switch 16 is on. Due to the hysteresis of the hysteresis comparator 18, the switch 16 is turned off at a later time t1 until the internal supply voltage $V_{DD}$ falls below a threshold value, e.g. at time t2, and then the hysteresis comparator 18 turns on the switch 16 again so that the capacitor C is charged by the external power source Vcc to pull up the internal supply voltage $V_{DD}$. At time t3, the switch 16 is turned off by the hysteresis comparator 18 again to cause the internal supply voltage $V_{DD}$ to start to fall down again. After the external supply voltage Vcc falls below the standby power 30, the capacitance of the capacitor C determines the decreasing slope of the internal supply voltage $V_{DD}$ as $$R_{SW}=\text{decreasing slope of } Vcc(V/s), \quad \text{[Eq-2]}$$

$$C>I\_\text{load}/R_{SW} \quad \text{[Eq-3]}$$

For example, if I_load=5 mA, $R_{SW}$=5V/1 ms=5K(V/s), then $$C>5 \text{ mA}/5 \text{ KV/s}=1 \text{ μF}.$$

If I_load=20 mA, $R_{SW}$=5V/10 ms=0.5K(V/s), then $$C>20 \text{ mA}/0.5 \text{ KV/s}=40 \text{ μF}.$$

As shown by the dash line 32 in FIG. 5, when the capacitor C has a greater capacitance, the decreasing slope of the internal supply voltage $V_{DD}$ becomes flatter.

Figure 6:
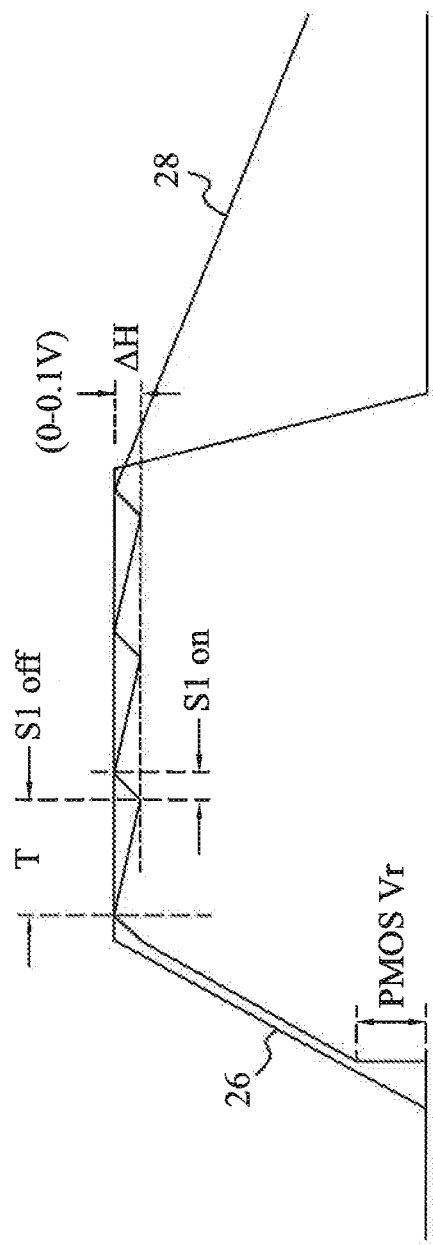
FIG. 6 is a diagram of comparison of an external supply voltage and an internal supply voltage.

Referring to FIG. 6, after power on, when the external supply voltage Vcc rises to a cut-in voltage Vr of the PMOSFET P1, the PMOSFET P1 is turned on and as a result, the internal supply voltage $V_{DD}$ jumps to a level that is lower than the external supply voltage Vcc by about 0.1V and then rises with the external supply voltage Vcc. After the external supply voltage Vcc reaches the rated value, the internal supply voltage $V_{DD}$ reaches Vcc later due to hysteresis. Afterwards, the internal supply voltage $V_{DD}$ is maintained at around VCC by the hysteresis comparator 18, and the ripple of the internal supply voltage $V_{DD}$ is determined by the hysteresis band ΔH. During this process, the switch 16 is switched on and off repeatedly by the control signal S1, with duration T of each turn-off period depending on the load current I_load and the hysteresis band ΔH. By selecting an appropriate hysteresis band ΔH, the switching frequency of the switch 16 and, therefore, the switching power loss can be reduced.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A power off delay circuit, comprising:
   an external power input terminal;
   an internal power supply terminal;
   a capacitor connected to the internal power supply terminal;
   a switch connected between the external power input terminal and the internal power supply terminal; and
   a comparator having a voltage source terminal connected to the internal power supply terminal, a first input terminal connected to the external power input terminal, a second input terminal connected to the internal power supply terminal, and an output terminal connected to the switch for providing a control signal to switch the switch;
   wherein the switch is on in a first state to connect the external power input terminal to the internal power supply terminal, and is off in a second state to disconnect the external power input terminal from the internal power supply terminal.

2. The power off delay circuit of claim 1, wherein the switch comprises a MOSFET connected between the external power input terminal and the internal power supply terminal, and controlled by the control signal.

3. The power off delay circuit of claim 1, wherein the switch comprises:
   a PMOSFET formed on a well, connected between the external power input terminal and the internal power supply terminal, and controlled by the control signal; and
   a voltage switching circuit connected to the well to switch a voltage of the well.

4. The power off delay circuit of claim 3, wherein the voltage switching circuit comprises:
   a second PMOSFET formed on the well and connected between the external power input terminal and the well, operative to connect the external power input terminal to the well in the first state; and
   a resistor connected between the internal power supply terminal and the well, for applying a voltage from the internal power supply terminal to the well in the second state.

5. The power off delay circuit of claim 4, wherein the resistor comprises a well resistor established by the well.

6. The power off delay circuit of claim 1, wherein the comparator comprises an initial-state setting resistor connected to the output terminal of the comparator, for setting an initial logic state of the control signal.

7. The power off delay circuit of claim 1, wherein the comparator comprises:
   a first input transistor having a gate connected to the external power input terminal;
   a second input transistor;
   a hysteresis resistor connected between the second input terminal of the comparator and a gate of the second input transistor; and
   a hysteresis current source connected in series to the hysteresis resistor;
   wherein the hysteresis resistor establishes a voltage drop to determine a hysteresis band of the comparator.

8. The power off delay circuit of claim 1, wherein the capacitor has a capacitance defining a delay time of the power off delay circuit.

9. A power off delay method, comprising the steps of:
   (A) applying a voltage of an external power input terminal to a first input terminal of a comparator;
   (B) applying a voltage of an internal power supply terminal to a second input terminal and a voltage source terminal of the comparator;
   (C) performing hysteresis control by the comparator according to the voltage of the external power input terminal and the voltage of the internal power supply terminal, for connecting the external power input terminal to or disconnecting the external power input terminal from the internal power supply terminal; and
   (D) charging a capacitor connected to the internal power supply terminal during the external power input terminal connecting to the internal power supply terminal.

10. The power off delay method of claim 9, wherein the step C comprises the step of turning on a MOSFET connected between the external power input terminal and the internal power supply terminal by a control signal generated by the comparator, for connecting the external power input terminal to the internal power supply terminal.

11. The power off delay method of claim 9, wherein the step C comprises the steps of:
   turning on a PMOSFET formed on a well and connected between the external power input terminal and the internal power supply terminal by a control signal generated by the comparator, for connecting the external power input terminal to the internal power supply terminal; and
   applying the voltage of the external power input terminal to the well.

12. The power off delay method of claim 9, wherein the step C comprises the steps of;
   turning off a PMOSFET formed on a well and connected between the external power input terminal and the internal power supply terminal by a control signal generated by the comparator, for disconnecting the external power input terminal from the internal power supply terminal; and
   applying the voltage of the internal power supply terminal to the well.

13. The power off delay method of claim 9, further comprising the step of setting an initial state in which the external power input terminal is connected to the internal power supply terminal.

* * * * *